(12) United States Patent
Robertson et al.

(10) Patent No.: US 10,031,771 B2
(45) Date of Patent: Jul. 24, 2018

(54) MULTIPLE PROCESSOR CORE INTERRUPT PRIORITY LEVELS

(71) Applicant: FREESCALE SEMICONDUCTOR, INC., Austin, TX (US)

(72) Inventors: Alistair Paul Robertson, Glasgow (GB); Andrey Kovalev, Sauerlach (DE); Jeffrey Thomas Loeliger, Glasgow (GB)

(73) Assignee: NXP USA, Inc., Austin, TX (US)

( * ) Notice: Subject to any disclaimer, the term of this patent is extended or adjusted under 35 U.S.C. 154(b) by 147 days.

(21) Appl. No.: 14/739,028

(22) Filed: Jun. 15, 2015

(65) Prior Publication Data

US 2016/0364264 A1   Dec. 15, 2016

(51) Int. Cl.
G06F 9/46 (2006.01)
G06F 9/48 (2006.01)
G06F 13/26 (2006.01)

(52) U.S. Cl.
CPC ............ *G06F 9/4818* (2013.01); *G06F 13/26* (2013.01)

(58) Field of Classification Search
None
See application file for complete search history.

(56) References Cited

U.S. PATENT DOCUMENTS

| 7,921,317 | B2 | 4/2011 | Malek | |
| 2009/0100432 | A1* | 4/2009 | Holloway | G06F 9/4881 718/103 |
| 2009/0113439 | A1* | 4/2009 | Zettler | G06F 9/4887 718/103 |
| 2015/0154054 | A1* | 6/2015 | Ohno | G06F 9/5016 718/104 |

* cited by examiner

Primary Examiner — Wynuel Aquino

(57) ABSTRACT

A processor system includes at least two processor cores and an interrupt controller including interrupt priority registers configured for registering interrupt priorities of the respective processor cores. The processor system further includes at least two task timers associated with respective processor cores. Each task timer includes a counter configured for producing a counter value, a timeout value register configured for storing a timeout value and a tidemark value register configured for storing a tidemark value smaller than the timeout value. Each task timer is configured for producing a timeout signal when the counter value equals the timeout value and for producing a tidemark signal when the counter value equals the tidemark value. The interrupt controller is configured for increasing the interrupt priority of a processor core in response to a tidemark signal and for decreasing the interrupt priority of a processor core in response to a timeout signal.

20 Claims, 3 Drawing Sheets

MULTIPLE PROCESSOR CORE INTERRUPT PRIORITY LEVELS

FIELD OF THE INVENTION

This invention relates to multiple processor core interrupt priority levels. More in particular, this invention relates to managing interrupt priority levels in a processor having multiple cores in relation to the time assigned to processing tasks.

BACKGROUND OF THE INVENTION

Multiple core processors are known in the art. Two or more cores can be present in a single processor. This allows parts of software programs to be executed in parallel, that is, simultaneously, thus reducing the execution time. However, the processor cores typically share some resources, such as memory or a data bus. When two or more cores attempt to access a common resource simultaneously, a conflict occurs. Such a conflict is likely to cause delays, as at least one of the cores will have to wait for another core to finish its resource access. These delays can significantly reduce the benefits of having multiple cores.

It has been proposed to assign priorities to the cores of a multiple core processor, cores having a higher priority being allowed to access a common resource before cores having a lower priority. Although assigning priorities establishes a clear order in which cores are granted access, some low priority cores may be denied access. As a result, some software program parts may be significantly delayed or may not be executed at all.

BRIEF DESCRIPTION OF THE DRAWINGS

Details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DESCRIPTION OF THE PREFERRED EMBODIMENTS

Embodiments of the invention provide a multiple core processor system, including a multiple core processor and additional components, which can use timers to adjust priorities of the cores. Each processor core can be assigned a task timer which includes a counter for counting time units, such as microseconds, or clock pulses. The counter tracks the time a task being executed by a processor core takes. To be able to efficiently allocate processor core time to various tasks, the interrupt priority level of a core may be chosen to reflect the relative importance of a task. This interrupt priority level determines which processor core first accesses a common resource, such as, for example, a data bus. An interrupt priority level is typically assigned prior to the task being executed. To prevent some tasks from taking up too much processor core time, a timeout value may be used which causes the interrupt priority level of a processor core, and hence of the task it is executing, to be lowered when a timeout occurs and the assigned processing time has therefore expired.

In embodiments of the present invention, the task timer of each processor core can produce at least two signals: a first signal when a tidemark timer value is reached, and a second signal when a timeout timer value is reached. The first or tidemark signal is a warning that the timeout value is approaching. In response, in some embodiments, the interrupt priority level of the particular processor core can be increased to increase the probability that the execution of the task will be finished before the timeout occurs.

In the following, for the sake of understanding, the circuitry is described in operation. However, it will be apparent that the respective elements are arranged to perform the functions being described as performed by them.

Figure 1:
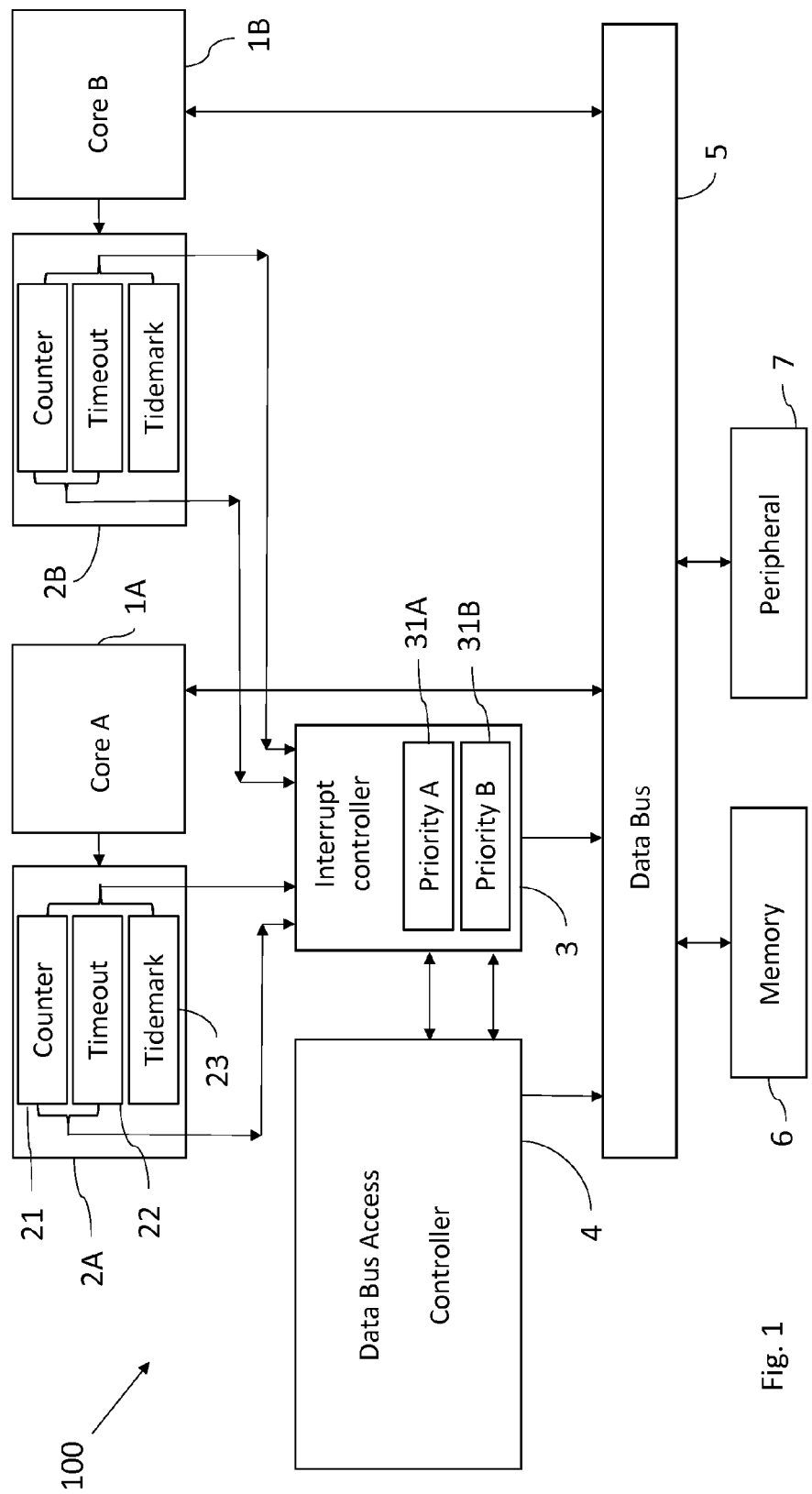
FIG. 1 schematically shows an example of an embodiment of a multiple core processor system.

A multiple core processor system 100 according to an embodiment of the invention is schematically illustrated in FIG. 1. The multiple core processor system 100 of FIG. 1, which may be implemented in a single integrated circuit (or, alternatively, in discrete components), is shown to include processor cores 1 constituting a multiple core processor, task timers 2, an interrupt controller 3, a data bus access controller 4, and a data bus 5. Connected to the data bus 5 are a memory 6 and a peripheral device 7, which may also be part of the multiple core processor system 100, but may also be external to the system 100. The memory 6 may be an (internal or external) RAM (random access memory) while the peripheral device 7 may be an I/O (input/output) device, for example. The data bus 5 may include a crossbar type switch. It is noted that the data bus 5 can be capable of handling all types of data, including processor core instructions. The data bus controller 4 can be implemented by using a state machine, although other embodiments of the data bus controller can also be envisaged. Although only a single memory and a single peripheral device are shown in FIG. 1, multiple memories and/or multiple peripheral devices can be present.

In the example shown in FIG. 1 the multiple core processor system 100 includes two processor cores or CPUs (central processing units) 1: a first processor core 1A and a second processor core 1B. Embodiments with more than two processor cores, for example four, five, eight, ten, sixteen or even more cores, can be envisaged, but for the sake of clarity an example including only two cores is provided. Each core is shown to be connected to the data bus 5.

The multiple core processor system 100 further includes two task timers: a first task timer 2A associated with the first processor core 1A and a second task timer 2B associated with the second processor core 1B. Each task timer includes a counter 21, a timeout register 22 and a tidemark register 23. As will later be explained in more detail with reference to FIG. 2, each task timer can further include a timeout comparator 24 and a tidemark comparator 25. The counter 21 can be set to zero at the beginning of a processor core task, and can count up as the task is being executed by the associated core. It is noted that in some embodiments, the counter can initially be set to a non-zero value and count down to zero, in which case the timeout value typically equals zero. In such embodiments, the timeout value register can be configured to store the fixed value zero, or may even be omitted.

The counter 21 can count in any suitable unit representing time and may count clock pulses, but may alternatively count pulses representing microseconds, for example. Additionally, or alternatively, the counter may count degrees of an angle, for example when the multiple core processor is used with an engine control system. Multiple counters may be present and count in multiple units originating from multiple sources, such as a PLL (phase-locked loop) device, for example a peripheral device, and an FM-PLL (frequency modulation phase-locked loop) device, for example a system clock.

The timeout register 22 stores a timeout value associated with the task. Typically the timeout value will represent the maximum time the task is allowed to take. The timeout value may be supplied by the operating system and be predetermined by a user. Alternatively, or additionally, the timeout value may be provided by the application software used for executing the task. The timeout comparator 24 shown in FIG. 2 can compare the counter value with the timeout value and produces a timeout signal when these values are equal. In other words, the timeout comparator produces the timeout signal when the executing time of the particular processor core task has reached the timeout value. This timeout signal is fed to both the interrupt controller 3 and the data bus controller 4.

The interrupt controller 3 includes interrupt priority level registers 31A, 31B, . . . , 31N (where N can equal the number of processor cores) for each processor core and includes in the present example a first interrupt priority level register) 31A associated with the first processor core 1A, and a second interrupt priority level register 31B associated with the second processor core 1B. The interrupt controller 3 can feed the interrupt priority levels stored in these registers to the data bus controller 4 to control data bus access in dependence of the interrupt priority levels.

In response to the timeout signal, the interrupt controller 3 can lower the interrupt level (also known as interrupt priority level) of the associated processor core. The interrupt level may be lowered by a single level, or by multiple levels. In some embodiments, the interrupt level may be set to the lowest level in response to a timeout signal, indicating that the particular processor core can only get data bus access if all other cores (or, in the present example, the other core) do not require data bus access.

It is noted that various interrupt priority level schemes can be used. In some schemes, only two interrupt priority levels are used, while in other schemes, as many as thirty-two or even more interrupt priority levels may be distinguished. In some schemes, the highest interrupt priority level has the lowest interrupt level priority register value, a value zero for example indicating the highest level. In other schemes, the highest interrupt priority level has the highest interrupt level priority register value. Embodiments of the present invention are suitable for any interrupt priority level scheme.

The data bus controller 4 can receive timeout signals from the task timers 2A and 2B and can use these signals to trigger a new interrupt priority levels setting. Alternatively, the data bus controller 4 may be triggered by a new interrupt priority level received from the interrupt controller 3. As mentioned above, the data bus controller 4 can be configured to selectively provide data bus access to the processor cores 1A and 1B, based upon their associated interrupt priority levels.

In the embodiment shown, the interrupt controller 3 can receive information from the task timers (2A and 2B in the example of FIG. 1), determine interrupt priority levels on the basis of that information, and supply interrupt priority levels to the data bus controller 4, for example. In other embodiments, the interrupt controller 3 may receive interrupt priority levels and interrupt priority adjustment information from the data bus controller 4, and returns interrupt priority levels to the data bus controller.

In accordance with embodiments of the present invention, each task timer (2A and 2B in FIG. 1) also includes a tidemark value register 23. This register is configured for storing a tidemark value which effectively serves to indicate that the timeout value is approaching. That is, the tidemark value is a time value smaller than the timeout value. A tidemark comparator 25 of the task timers compares the counter value of the counter 21 with the tidemark value stored in the tidemark value register 23 and produces a tidemark signal if these values are equal, that is, when the counter value equals the tidemark value. As the tidemark value is smaller than the timeout value, the tidemark signal is produced before the timeout signal is.

The task timers 2A and 2B supply any tidemark signals, as well as any timeout signals, to the interrupt controller 3. In response to a tidemark signal, the interrupt controller 3 can alter the interrupt priority level of a processor core by adjusting the priority level value in the corresponding register (31A or 31B in FIG. 1). More in particular, the interrupt controller 3 can increase the interrupt priority level of the processor core corresponding with the tidemark signal. Increasing the interrupt priority level of a processor core will give that core quicker access to the data bus, and hence to any units connected to the data bus, such as the memory device 6 and the peripheral device 7 in FIG. 1. As a result, the particular processor core will typically be able to finish its task more quickly, thus increasing the probability that the task is completed before the counter reaches the timeout value.

It can thus be seen that reaching the timeout value can result in a decrease of the interrupt priority level, and hence to a decreased probability of access to the data bus, reaching the tidemark value can result in an increase of the interrupt priority level, and hence to an increased probability of access to the data bus. Embodiments of the present invention therefore provide an increased probability of completing a processor task in a time period between the tidemark value and the timeout value.

In embodiments of the invention, the interrupt controller is configured for decreasing an interrupt priority level of a processor core when an interrupt priority level of another core is increased. As described above, increasing an interrupt priority level can be done in response to a counter reaching a tidemark value. By then decreasing the interrupt priority level of the other processor core or all other processor cores, the probability of the processor core whose counter reached the tidemark level finishing its task is increased. That is, the effect of increasing a processor core's interrupt priority level is enhanced by decreasing the interrupt priority level of one or more other cores. In some embodiments, decreasing the interrupt priority level is limited to only those processor cores which have not reached their respective tidemark value, that is, those cores whose interrupt priority levels have not been increased yet.

The tidemark value may be determined as a percentage of the timeout value, where the percentage is less than 100. For example, the tidemark value may be set at approximately 70% of the timeout value, for example. Suitable values range between 50% and 90%, more in particular between 60% and 80%, but the invention is not limited to these values. The percentage used can depend on the particular processor system configuration and the particular tasks being executed by the processor cores.

Additionally, or alternatively, the difference between the timeout value and the tidemark value may have a minimum, for example a certain number of clock cycles (e.g. 1000) or a certain minimum time duration (e.g. 10 microseconds).

The difference between the timeout value and the tidemark value may also be a fixed number of clock cycles or a fixed time duration. The difference used can depend on the particular processor system configuration and the particular tasks being executed by the processor cores.

In a non-limiting example, a processing task was scheduled to last 50 µs (microseconds). Accordingly, the timeout value was set to 50 µs. The tidemark value was set at 80% of 50 µs, equalling 40 µs. The interrupt priority level was initially set at 6 on a scale from 1 to 10, with 10 representing the highest priority level. As the task was not completed after 40 µs, a tidemark signal was produced and the interrupt priority level was raised to 8. As the task was still not completed after 50 µs, a timeout signal was produced. As a result, the interrupt level was reduced to 6, the original interrupt priority level.

In embodiments of the present invention, therefore, the interrupt controller is configured for decreasing, in response to a timeout signal of an associated task timer, the interrupt priority level of a processor core to the interrupt priority level that processor core had immediately before the tidemark signal. In other words, in response to the timeout signal, the interrupt priority level is brought back to the original level of the task. In other embodiments of the present invention, the interrupt controller is configured for decreasing, in response to a timeout signal of an associated task timer, the interrupt priority level of a processor core to another interrupt priority level, for example lower than the one the processor core had immediately before the tidemark signal. In other words, in response to the timeout signal, the interrupt priority level may brought back to a lower level than the original level of the task, or alternatively to a higher level than the original level of the task. However, after the timeout signal, the interrupt priority level will typically be reduced, thus decreasing the availability of common resources, such as a data bus, to the particular processor core.

Suitable interrupt priority levels may be assigned to a task, together with the tidemark and timeout values. Accordingly, a processor core task may have the following parameters:
  Processor core number
  Timeout value
  Tidemark value
  Initial interrupt priority level
  Intermediate interrupt priority level
  Final interrupt priority level
In the above list, the intermediate interrupt priority level is assigned to a core after the tidemark signal is produced (and until the timeout signal is produced). The final interrupt level is assigned to a core in response to a timeout signal.

Figure 2:
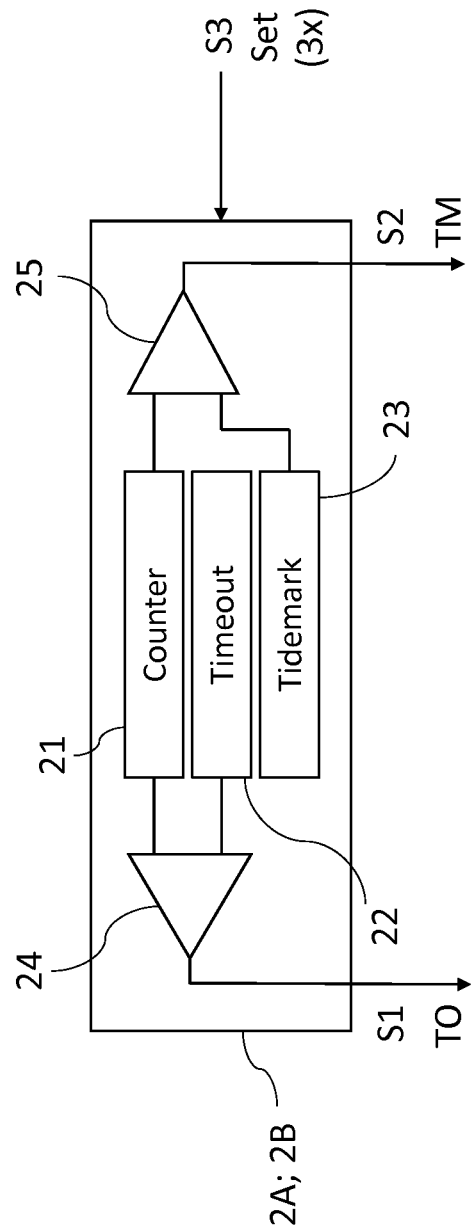
FIG. 2 schematically shows an example of an embodiment of task timer of a multiple core processor system.

In FIG. 2, an exemplary embodiment of a task timer 2 is shown in more detail. The task timer 2 of FIG. 2 is shown to include a counter 21, a timeout value register 22 and a tidemark value register 23. The counter 21 and the timeout register 22 are connected to a comparator 24 which can produce a timeout signal S1 when the counter value and the timeout value are equal. The counter 21 and the tidemark value 23 are connected to a comparator 25 which can produce a tidemark signal S2. The task timer 2 is further configured to receive a settings signal S3 which can include a timeout value signal, a tidemark value signal and/or a counter reset signal (possibly 3 signals). In some embodiments, the settings signal S3 is provided by the associated processor core. To this end, each processor core may be configured to calculate tidemark values for the associated task timer.

It is noted that the task timer 2 may include further components, such as latches for latching the timeout signal S1 and/or the tidemark signal S2, which are not shown in FIG. 2 for the sake of clarity of the illustration.

In the examples described above, a single tidemark value was used. In an embodiment of the present invention, multiple tidemark values can be used, which can give rise to multiple tidemark signals. Accordingly, at least one task timer can be configured for storing multiple tidemark values, and the interrupt controller can be configured for repeatedly increasing the interrupt priority level of a processor core in response to multiple tidemark signals. The different tidemark values may be associated with different units and/or counters. A first tidemark value may, for example, be 40 µs, while a second tidemark value associated with the same processor core may, for example, be 80°.

In embodiments of the invention, the interrupt priority levels can be used to manage access of the processor core to a common resource, such as a data bus. It is noted that the interrupt priority levels can be used to handle access to more than one common resource, such as a shared data bus and a local data bus. Another common resource may be a memory unit which is not connected via a data bus but directly to the processor cores. The interrupt priority levels as managed in accordance with the invention can of course also be used to handle software interrupts and hardware interrupts, including inter-processor interrupts.

Figure 3:
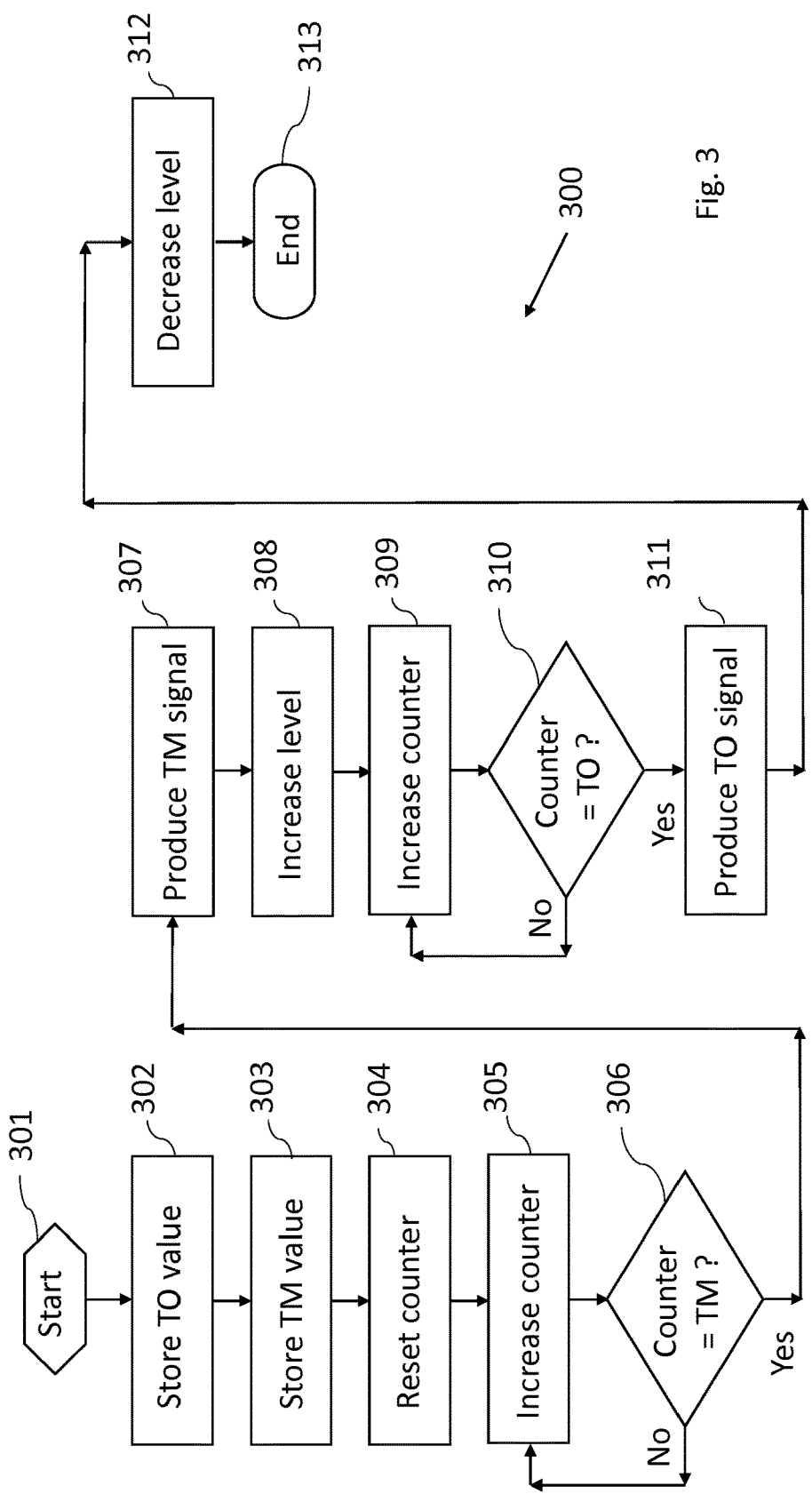
FIG. 3 schematically shows an example of an embodiment of a method of managing a multiple core processor.

A method in accordance with an embodiment of the present invention is schematically illustrated in FIG. 3. The method 300 includes an initial step 301 in which the method is initiated. In step 302, a timeout value is stored in the corresponding register of the task timer, while in step 303, a tidemark value is stored in the corresponding register of the task timer. In step 304, the counter is set to zero. Then, in step 305, the counter is increased (typically by one). In step 306, it is checked whether the counter value equals the tidemark (TM) value. If this is not the case, then the method continues with step 305, where the counter is increased again. If this is the case, meaning that the counter value does equal the tidemark value, then the method continues with step 307 in which the tidemark signal is produced, and then step 308, in which the interrupt priority level is increased. Then, in step 309, the counter value is increased again. In step 310, the counter value is compared with the timeout (TO) value. If the counter value does not equal the timeout value, then the method loops back to step 309 in which the counter value is increased again. If the counter value does equal the timeout value, then a timeout signal is produced in step 311 in response to which the interrupt priority level is decreased in step 312. The method then ends in step 313.

It is noted that the final step 313 is only reached when the task is not completed when the timeout value has been reached. Typically, the task will be completed before the timeout value is reached and the method 300 will be aborted in either the loop constituted by steps 305 & 306 (when the tidemark value has not yet been reached) or the loop constituted by steps 309 & 310 (when the tidemark value has been reached but the timeout value has not yet been reached).

Embodiments of the invention provide a processor system comprising at least two processor cores; an interrupt controller comprising interrupt priority registers configured for registering interrupt priority levels of the respective processor cores; and at least two task timers, each task timer being associated with a respective processor core; each task timer comprising a counter configured for producing a counter value, a timeout value register configured for storing a timeout value, and a tidemark value register configured for storing a tidemark value smaller than the timeout value; each task timer being configured for producing a timeout signal when the counter value equals the timeout value and for producing a tidemark signal when the counter value equals the tidemark value; wherein the interrupt controller is configured for increasing the interrupt priority level of a processor core in response to a tidemark signal of the associated task timer; and wherein the interrupt controller is configured for decreasing the interrupt priority level of a processor core in response to a timeout signal of the associated task timer.

The processor system may further comprise a data bus coupled with the processor cores; and a data bus controller coupled with the interrupt controller and with the data bus and configured to selectively provide data bus access to the processor cores on the basis of respective interrupt priority levels. A memory device and a peripheral device may be coupled to the data bus.

Embodiments of the invention provide a method of controlling a processor comprising at least two processor cores, the method comprising storing, for each processor core, an interrupt priority level; storing, for each processor core, a timeout value and a tidemark value; starting, for each processor core, a counter; producing a tidemark signal when a counter value associated with a processor core equals the respective tidemark value; increasing an interrupt priority level of a processor core in response to a respective tidemark signal; producing a timeout signal when the counter value associated with a processor equals the respective timeout value; and decreasing the interrupt priority level of a processor core in response to a respective timeout signal.

Embodiments of the invention may at least partially be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a DVD or memory stick, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processor system comprising
a plurality of task timers associated with respective processor cores, including a first task timer, associated with a first processor core, for producing a counter value, storing a timeout value at a timeout register that indicates a timeout time for executing a task associated with the first task timer, storing a tidemark value, at a tidemark register, that is smaller than the timeout value and that indicates an elapsed time, producing a timeout signal when the counter value equals the timeout value, and producing a tidemark signal when the counter value equals the tidemark value, and a second task timer, associated with a second processor core, for producing a counter value, storing a timeout value at a timeout register that indicates a timeout time for executing a task associated with the second task timer, storing a tidemark value, at a tidemark register, that is smaller than the timeout value and that indicates an elapsed time, producing a timeout signal when the counter value equals the timeout value, and producing a tidemark signal when the counter value equals the tidemark value, wherein each timer's timeout signal indicates the timeout time for its respective task, each timer's tidemark signal indicates the elapsed time warning of the temporal approach of its respective timeout signal; an interrupt controller comprising a plurality of interrupt priority registers, including a first interrupt priority register for registering interrupt priority levels of the first processor core by increasing the interrupt priority level of the first processor core in response to the tidemark signal of the first task timer and increasing access to a physical resource of the processor system by the first processor core according to the increased interrupt priority level of the first processor core relative to other accesses corresponding to other cores for execution of its respective task by the first processor core, and decreasing the interrupt priority level of the first processor core in response to the timeout signal of its associated task timer and decreasing access to the physical resource by the first processor core according to the decreased interrupt priority level of the first processor core relative to other accesses corresponding to other cores for execution of its respective task by the first processor core, a second interrupt priority register for registering interrupt priority levels of the second processor core by increasing the interrupt priority level of the second processor core in response to the tidemark signal of the second task timer and increasing access to the physical resource by the second processor core according to the increased interrupt priority level of the second processor core relative to other accesses corresponding to other cores for execution of its respective task by the second processor core, and decreasing the interrupt priority level of the first processor core in response to the timeout signal of its associated task timer and decreasing access to the physical resource by the second processor core according to the decreased interrupt priority level of the second processor core relative to other accesses corresponding to other cores for execution of its respective task by the second processor core.

2. The processor system according to claim 1, wherein the interrupt controller is configured for decreasing, in response to a timeout signal of an associated task timer, an interrupt priority level of a processor core to an interrupt priority level of that processor core immediately before the tidemark signal.

3. The processor system according to claim 1, wherein at least one task timer is configured for storing multiple tidemark values, and wherein the interrupt controller is configured for repeatedly increasing the interrupt priority level of a processor core in response to multiple tidemark signals.

4. The processor system according to claim 1, wherein a task timer comprises a first comparator for comparing a counter value and a timeout value.

5. The processor system according to claim 1, wherein a task timer comprises a second comparator for comparing a counter value and a tidemark value.

6. The processor system according to claim 1, wherein a task timer comprises multiple counters configured for counting multiple units.

7. The processor system according to claim 6, wherein the multiple units comprise at least one of a time unit and an angle unit.

8. The processor system according to claim 1, wherein a task timer is configured for producing a reset signal when the counter is reset; and wherein the interrupt controller is configured for decreasing an interrupt priority level of a processor core in response to the reset signal.

9. The processor system according to claim 1, wherein the interrupt controller is configured for decreasing an interrupt priority level of a processor core when an interrupt priority level of another processor core is increased.

10. The processor system according to claim 1, further comprising
a data bus coupled with the processor cores; and
a data bus controller coupled with the interrupt controller and with the data bus and configured to selectively provide data bus access to the processor cores based on respective interrupt priority levels.

11. The processor system according to claim 10, further comprising at least one memory unit coupled to the data bus.

12. The processor system according to claim 10, further comprising at least one peripheral device coupled to the data bus.

13. The processor system according to claim 1, wherein each task timer is configured to receive a tidemark value and a timeout value from the associated processor core.

14. The processor system according to claim 13, wherein each processor core is configured to calculate tidemark values for the associated task timer.

15. A method of controlling a processor comprising at least two processor cores, the method comprising
associating a plurality of task timers with respective processor cores;
producing a counter value by a first task timer associated with a first processor core;
storing a timeout value at a timeout register that indicates a timeout time for executing a task associated with the first task timer;
storing a tidemark value, at a tidemark register, that is smaller than the timeout value and that indicates an elapsed time;
producing a timeout signal when the counter value equals the timeout value, and
producing a tidemark signal when the counter value equals the tidemark value, and
producing, by a second task timer associated with a second processor core, a counter value;
storing a timeout value at a timeout register that indicates a timeout time for executing a task associated with the second task timer;
storing a tidemark value, at a tidemark register, that is smaller than the timeout value and that indicates an elapsed time,
producing a timeout signal when the counter value equals the timeout value, and
producing a tidemark signal when the counter value equals the tidemark value,
wherein each timer's timeout signal indicates the timeout time for its respective task, each timer's tidemark signal indicates the elapsed time warning of the temporal approach of its respective timeout signal and wherein an interrupt controller comprises a plurality of interrupt priority registers;
registering, by a first interrupt priority register, interrupt priority levels of the first processor core by increasing the interrupt priority level of the first processor core in response to the tidemark signal of the first task timer and increasing access to a physical resource of the processor system by the first processor core according to the increased interrupt priority level of the first processor core relative to other accesses corresponding to other cores for execution of its respective task by the first processor core;
decreasing the interrupt priority level of the first processor core in response to the timeout signal of its associated task timer and decreasing access to the physical resource by the first processor core according to the decreased interrupt priority level of the first processor core relative to other accesses corresponding to other cores for execution of its respective task by the first processor core
registering, by a second interrupt priority register, interrupt priority levels of the second processor core by increasing the interrupt priority level of the second processor core in response to the tidemark signal of the second task timer and increasing access to the physical resource by the second processor core according to the increased interrupt priority level of the second processor core relative to other accesses corresponding to other cores for execution of its respective task by the second processor core, and decreasing the interrupt priority level of the first processor core in response to the timeout signal of its associated task timer and decreasing access to the physical resource by the second processor core according to the decreased interrupt priority level of the second processor core relative to other accesses corresponding to other cores for execution of its respective task by the second processor core.

16. The method according to claim 15, wherein decreasing, in response to the timeout signal, the interrupt priority level of a processor core comprises decreasing said interrupt priority level to an interrupt priority level of that processor core immediately before the tidemark signal.

17. The method according to claim 15, further comprising using multiple tidemark values, and repeatedly increasing an interrupt priority level of a processor core in response to multiple tidemark signals.

18. The method according to claim 15, further comprising lowering a priority level of a processor core when a priority level of another processor core is increased.

19. The method according to claim 15, further comprising counting multiple units.

20. The method according to claim 19, wherein the multiple units comprise at least one of a time unit and an angle unit.

* * * * *